(12) United States Patent
Trojahn

(10) Patent No.: US 8,925,665 B2
(45) Date of Patent: Jan. 6, 2015

(54) PROPULSION AND DIRECTIONAL CONTROL APPARATUS FOR AN AIR CUSHION VEHICLE

(71) Applicant: Charles J. Trojahn, Somserset, NJ (US)

(72) Inventor: Charles J. Trojahn, Somserset, NJ (US)

(*) Notice: Subject to any disclaimer, the term of this patent is extended or adjusted under 35 U.S.C. 154(b) by 0 days.

(21) Appl. No.: 14/152,715

(22) Filed: Jan. 10, 2014

(65) Prior Publication Data

US 2014/0199166 A1 Jul. 17, 2014

Related U.S. Application Data

(60) Provisional application No. 61/751,432, filed on Jan. 11, 2013.

(51) Int. Cl.
 *B60V 1/14* (2006.01)
(52) U.S. Cl.
 CPC ............................... *B60V 1/14* (2013.01)
 USPC ............................. 180/117; 244/12.5
(58) Field of Classification Search
 USPC .................... 180/117, 123; 244/12.5
 See application file for complete search history.

(56) References Cited

U.S. PATENT DOCUMENTS

| 2,968,453 | A | * | 1/1961 | Bright .......................... 244/12.5 |
| 4,175,637 | A | | 11/1979 | Bertelsen |
| 4,795,111 | A | * | 1/1989 | Moller ......................... 244/23 C |
| 5,295,643 | A | * | 3/1994 | Ebbert et al. .................. 244/7 B |
| 5,338,252 | A | | 8/1994 | Bowler et al. |
| 5,662,464 | A | | 9/1997 | LaRose et al. |
| 5,746,390 | A | * | 5/1998 | Chiappetta ................... 244/12.3 |
| 6,708,920 | B2 | | 3/2004 | Fukuyama |
| 6,715,574 | B1 | | 4/2004 | Bertelsen et al. |
| 7,032,861 | B2 | | 4/2006 | Sanders, Jr. et al. |
| 7,249,732 | B2 | | 7/2007 | Sanders, Jr. et al. |
| 7,306,066 | B2 | | 12/2007 | Trojahn |
| 7,527,553 | B2 | | 5/2009 | Steinbeiss |
| 7,946,528 | B2 | | 5/2011 | Yoeli |
| 8,020,804 | B2 | | 9/2011 | Yoeli |
| 8,251,308 | B2 | * | 8/2012 | Choi ........................... 244/23 C |
| 2004/0094662 | A1 | * | 5/2004 | Sanders et al. ............... 244/12.5 |
| 2007/0095971 | A1 | * | 5/2007 | Yoeli ........................... 244/12.5 |

FOREIGN PATENT DOCUMENTS

EP 1449735 8/2004
GB 2088302 6/1982

* cited by examiner

*Primary Examiner* — Kevin Hurley
(74) *Attorney, Agent, or Firm* — Hoffmann & Baron, LLP

(57) ABSTRACT

An apparatus for controlling the propulsion and direction of an air cushion vehicle including a housing and a first vane pivotally coupled to the housing and pivotable about a first axis. A second vane assembly including at least one second vane is disposed within the first vane. The second vane assembly is pivotally coupled to the first vane and pivotal about a second axis. The second axis is orthogonal to the first axis. A first actuator is operably coupled to the first vane and a second actuator is operably coupled to the second vane assembly. The first actuator pivots the first vane and the second vane assembly about the first axis. The second actuator pivots the second vane assembly relative to the first vane and about the second axis to control the flow of air through the housing.

22 Claims, 14 Drawing Sheets

PROPULSION AND DIRECTIONAL CONTROL APPARATUS FOR AN AIR CUSHION VEHICLE

This application claims the benefit of priority to U.S. Provisional Patent Application Ser. No. 61/751,432 filed Jan. 11, 2013, the contents of which are incorporated by reference herein in its entirety.

BACKGROUND OF THE INVENTION

The present invention relates to an apparatus for controlling the propulsion and direction of an air-cushion vehicle such as a hovercraft. More particularly, the present invention relates to an omnidirectional control apparatus for an air-cushion vehicle.

Air cushion vehicles include ground effect machines or hovercrafts which move by utilizing a cushion of air underneath a lower surface of a support body or frame. The cushion of air supports the body above the ground or a water surface. In general, air cushion vehicles have at least one lifting fan positioned in a support body or frame having a propeller or turbine with an axis of rotation positioned in a substantially vertical direction. The lifting fan blows air in a downward direction underneath the support body to create an air cushion. A skirt body extends down from the support body about its perimeter so that when the lifting fan blows air underneath the support body, the skirt body will trap air underneath the support body so that a cushion of air is created. This cushion of air allows the support body to freely float above the ground or water. The skirt body is generally a cylindrically shaped tube that extends the entire perimeter of the support body. The skirt body is generally not air tight but is porous to allow the lifting fan to inflate the skirt.

U.S. Pat. No. 4,964,835 to Suto also shows a hovercraft with at least one thrust fan that is located on the upper surface of the sport body. The thrust fan is used to move the air cushion vehicle in the horizontal plane. The thrust fan is typically mounted so that its propeller or turbine has an axis of rotation positioned substantially in a horizontal direction parallel to the upper surface of the support body and forces air in a generally rearward direction. Vanes having a fixed axis of rotation direct the flow of air to control the vehicle. However, the air can only be directed left or right thereby limiting directional control.

In order to control exiting air flow, some prior art thrust fans may be pivotally mounted to rotate right and left to steer and turn the air cushion vehicle. However, rotating the fan significantly increased the complexity and cost of the design. In other designs, a number of fins are positioned behind the thrust fan to further direct the thrust air in a desired direction to turn the air cushion vehicle. However this flow does not assist in lifting the vehicle.

A problem associated with prior art designs is that the turning of the air cushion vehicle using the prior art designs is not accurate or precise, thus the maneuverability of the vehicle is very poor.

Accordingly, it would be desirable to provide a control apparatus for an air cushion vehicle that is omnidirectional and can provide increased precision and accuracy in vehicle control.

SUMMARY OF THE INVENTION

The present invention provides an omnidirectional control for a hovercraft. The control includes a two axis rotatable air deflector including a vane assembly disposed within a housing. The vane assembly may include a plurality of vanes including an outer vane and a plurality of inner vanes. The outer vane may be pivotally secured along a first axis of rotation. The inner vanes may be pivotally secured with regard to the outer vane about a second axis of rotation, wherein the first axis of rotation is generally perpendicular to the second axis of rotation. Accordingly, the outer and inner vanes may rotate about the first axis of rotation but only the inner vanes rotate about the second axis of rotation. A wide degree of directional control is therefore possible. By changing the direction of the air flow, the movement of the hovercraft can be controlled. A fan would be fixedly attached to the housing. The direction of the air flow is changed by moving the vanes, as the fan does not rotate. One or more fan/air deflector combination(s) could be used on a hovercraft.

The present invention also provides an apparatus for controlling the propulsion and direction of an air cushion vehicle including a housing and a first vane pivotally coupled to the housing and pivotable about a first axis. A second vane assembly including at least one second vane is disposed within the first vane. The second vane assembly is pivotally coupled to the first vane and pivotal about a second axis. The second axis is orthogonal to the first axis. A first actuator is operably coupled to the first vane and a second actuator is operably coupled to the second vane assembly. The first actuator pivots the first vane and the second vane assembly about the first axis. The second actuator pivots the second vane assembly relative to the first vane and about the second axis to control the flow of air through the housing.

The present invention also provides an apparatus for controlling the propulsion and direction of an air cushion vehicle including a housing and a first vane pivotally coupled to the housing and pivotable about a first axis. A second vane assembly includes a plurality of second vanes disposed within the housing and within the first vane. The plurality of second vanes is pivotally coupled to the first vane and each of the plurality of second vanes is pivotal about an axis generally orthogonal to the first axis. A first actuator is operably coupled to the first vane and a second actuator is operably coupled to the plurality of second vanes. The first actuator pivots the first vane and the second vane assembly about the first axis and the second actuator pivots the plurality of second vanes relative to the first vane and about the second axis to control the flow of air through the housing.

The present invention further provides a method of controlling the direction of an air powered vehicle including providing an air source to generate an air flow; directing the air flow past a vane assembly, the vane assembly including a first vane and a plurality of second vanes disposed within the first vane and pivotally secured thereto, the first vane and plurality of second vanes being pivotable about a first common axis of rotation and the plurality of second vanes being pivotable relative to the first vane about a second axis of rotation, wherein the second axis of rotation is offset from the first axis of rotation; operating a first actuator to pivot the vane assembly about the first axis; and operating a second actuator operably connected to the plurality of second vanes to pivot the plurality of second vanes relative to the first vane to control the flow of air exiting the vane assembly.

DETAILED DESCRIPTION OF THE PREFERRED EMBODIMENTS

Figure 1:
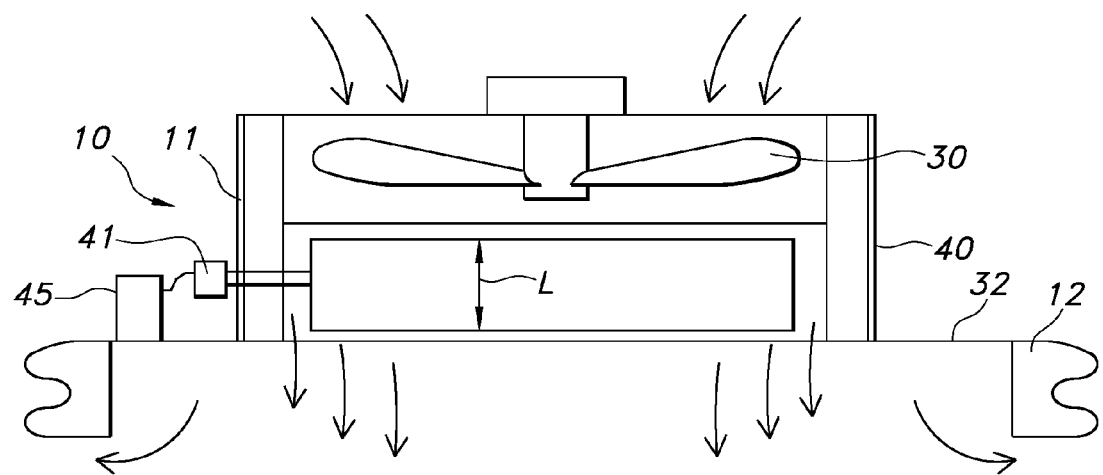
FIG. 1 is a side schematic view of the control apparatus of the present invention shown on an air cushion vehicle.
Figure 2:
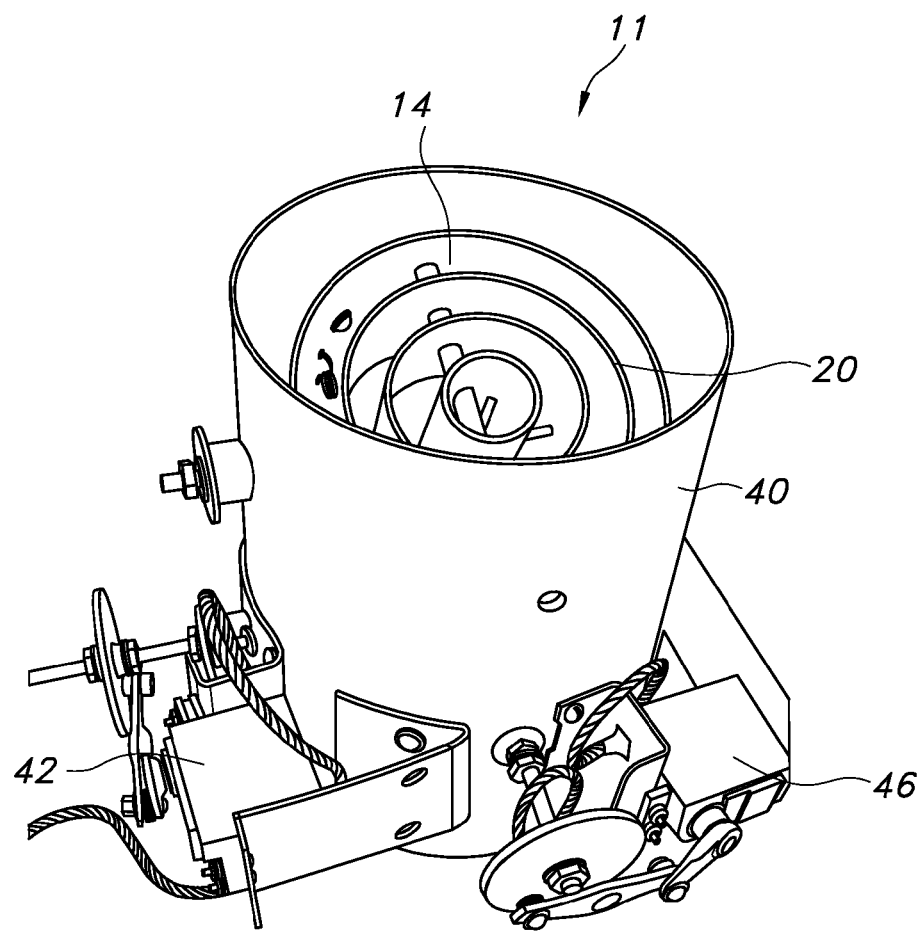
FIG. 2 is a top perspective views of the control apparatus of the present invention showing a downstream portion facing upwardly.
Figure 3:
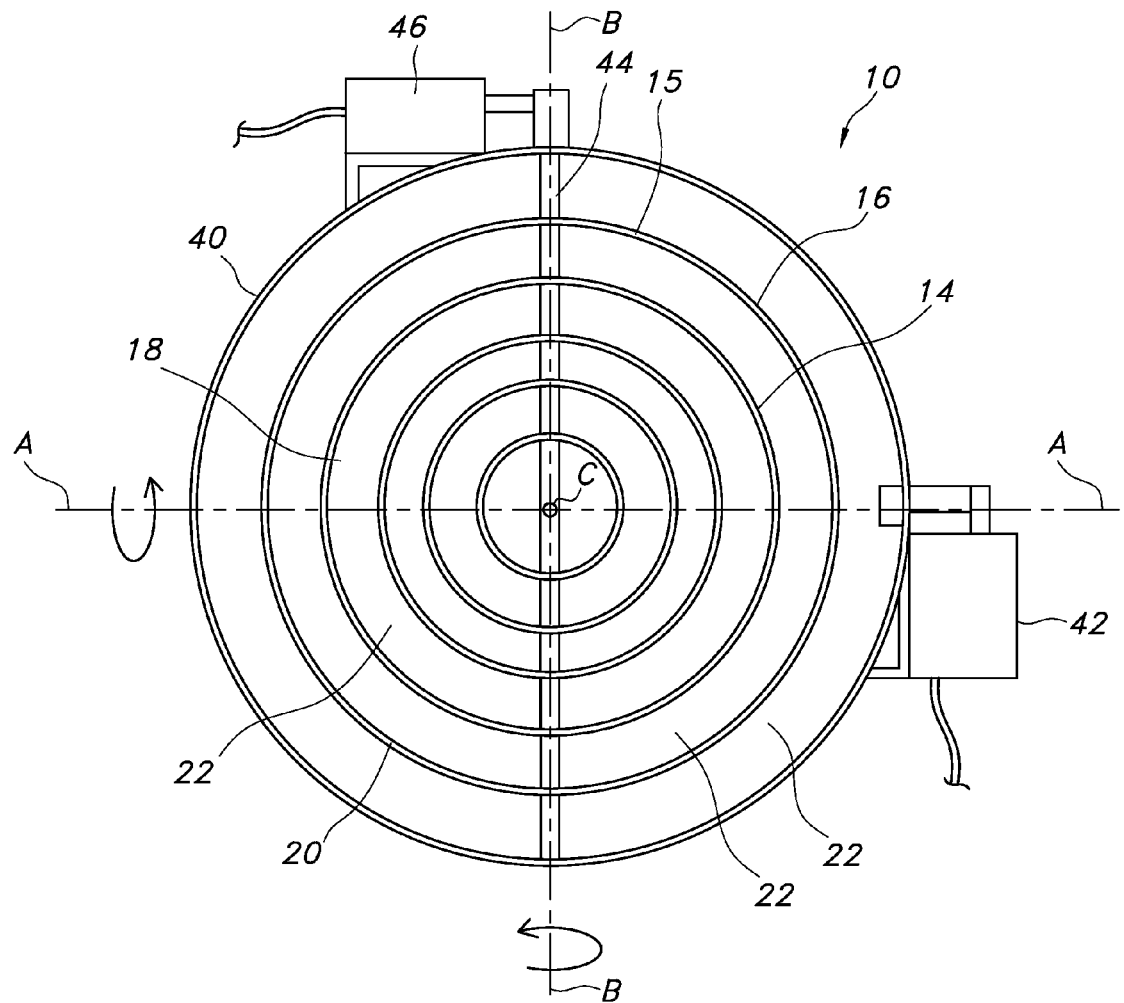
FIG. 3 is a top plan view of the control apparatus.
Figure 4:
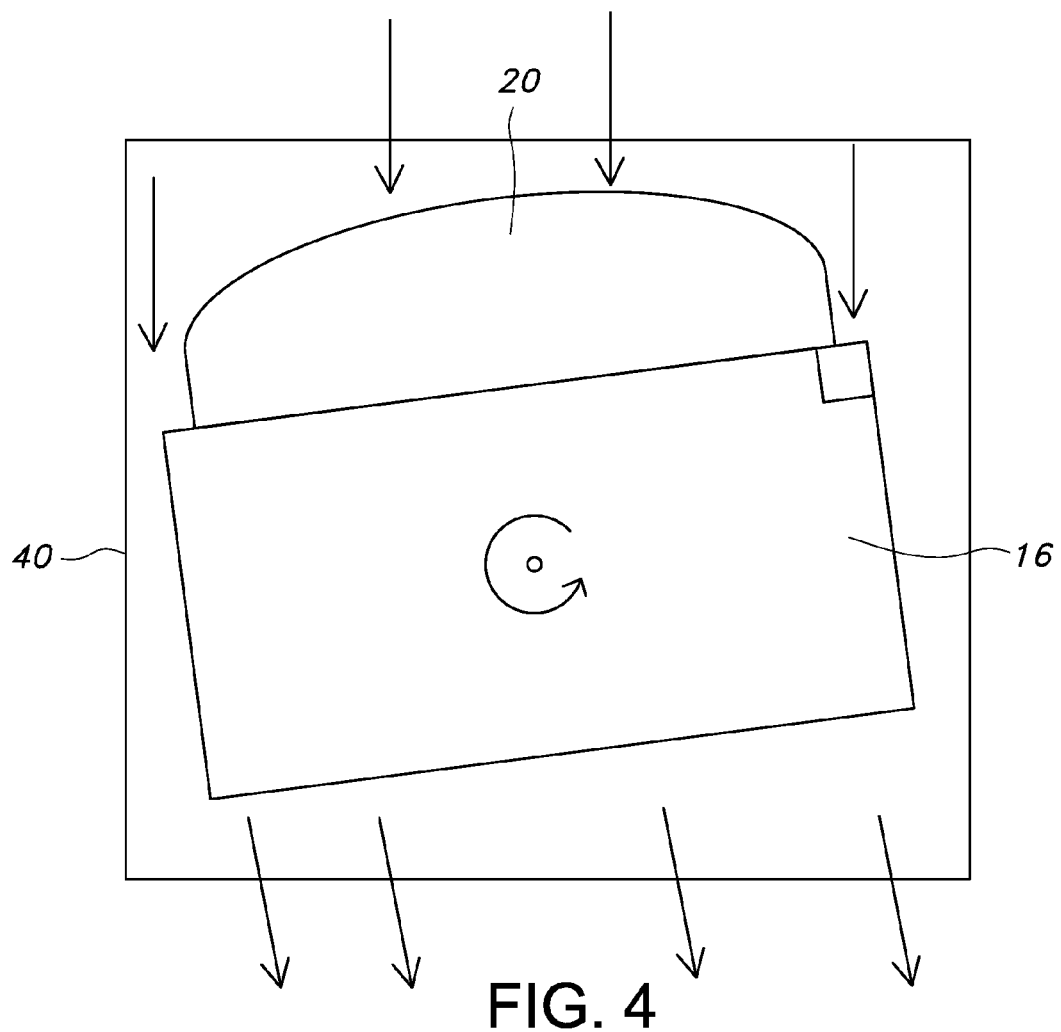
FIG. 4 is a schematic side view of the control apparatus.

With reference to FIGS. 1-3, the present invention includes an air deflector apparatus 10 for controlling the direction of air flow for an air cushion vehicle such as a hovercraft 12. By controlling the direction of the air flow, the direction and speed of the vehicle can be controlled. The air deflector apparatus 10 includes a vane assembly 11 disposed downstream of a fan 30 or other air flow source. The vane assembly 11 has a plurality of vanes 14 including an outer vane 16 and a plurality of inner vanes 18. The inner vanes 18 may be fixed relative to each other and form an inner vane assembly 20. The outer vane 16 may be pivotally secured along a first axis of rotation A-A. The inner vane assembly 20 may be pivotally secured with regard to the outer vane 16 about a second axis of rotation B-B, wherein the first axis of rotation is generally perpendicular to the first axis of rotation. Accordingly, the outer vane 16 and inner vanes 18 may rotate about the first axis of rotation but only the inner vanes 18 of the inner vane assembly 20 rotate about the second axis of rotation. The directed air flowing exiting the vane assembly 11 can be used to lift the vehicle 12 and/or propulsion and/or direction control.

While the drawings show a single outer vane and number of inner vanes, it is within the contemplation of the present invention that the outer vane could include a plurality of vanes and the inner vanes could include more of less vanes than shown.

In a preferred embodiment, the vanes 14 may include generally annular structures having a curved sidewall 15. The sidewall of each vane have a length L that extends in the axial direction. The plurality of inner vanes 18 may be disposed concentrically to each other such that each inner vane 18 has a smaller diameter the vane surrounding it. The inner vanes 18 sit within the diameter of the outer vane 16 and are concentric therewith. Accordingly, all the plurality of vanes 14 share a common center C.

Figure 5:
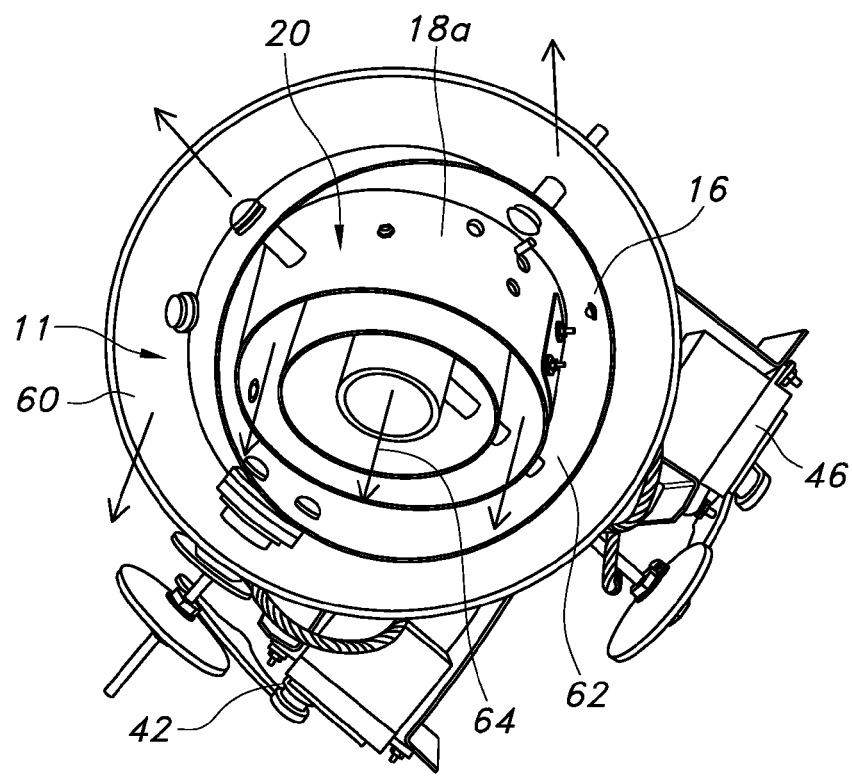
FIGS. 5 and 6 are perspective views of the control apparatus showing inner and outer vanes in different orientations.
Figure 6:
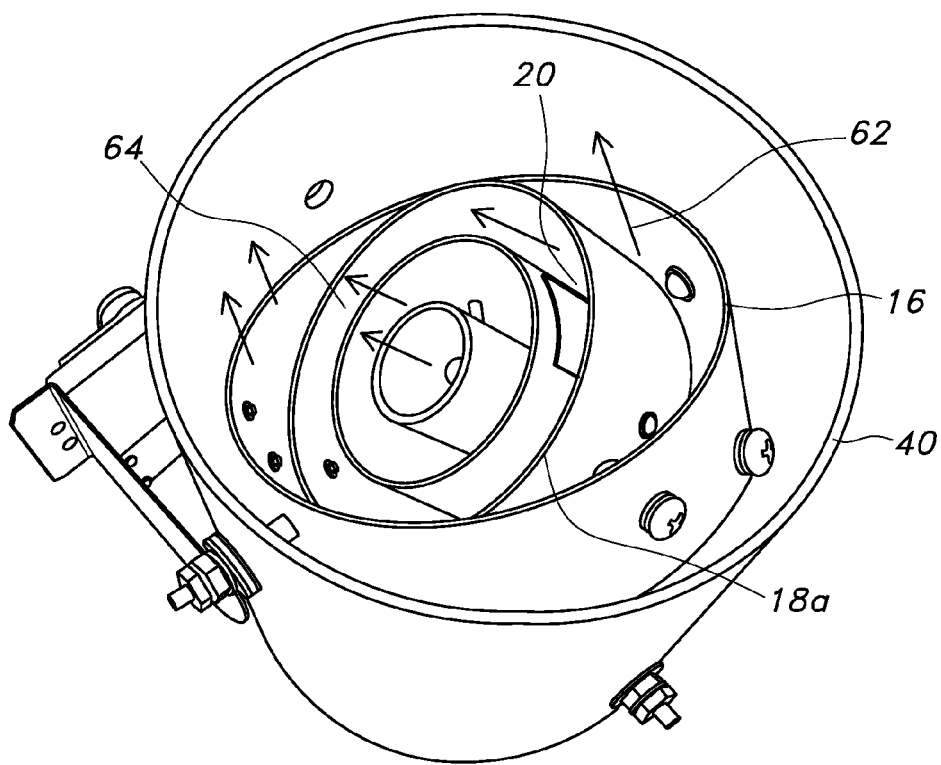

In between each of the vanes 14 is formed a flow channel 22 which may direct the flow of air generated by the fan 30. The inner and outer vanes are supported in a gimballed arrangement which permits the vanes 14 to direct air flow in a wide range of directions providing omnidirectional control. The direction of air flow is determined by the position of the vanes 14. By changing the direction of the air flow, the direction of travel of the hovercraft vehicle is controlled. Furthermore, the air flow can be directed straight down to assist in lifting the vehicle, and when the direction of the air flow direction is changed by the vane assembly 11 from the straight downward direction, the airflow can also be used for vehicle propulsion and motion control. Since the inner vanes 18 are able to be moved about two axis, A-A and B-B, a wide range of movement is possible and therefore, the air flow can be directed in many directions. FIGS. 5-6 show the vanes in various positions.

Figure 7:
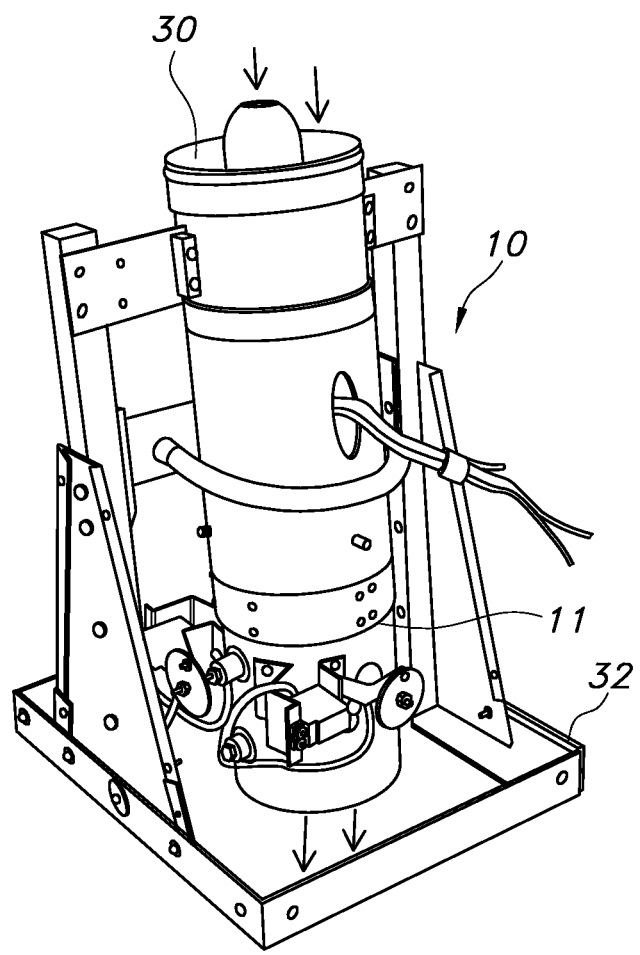
FIG. 7 is a perspective view of the control apparatus secured downstream to a fan.

The vane assembly 12 may be disposed downstream of a fan 30 as shown in FIGS. 1 and 7. The fan 30 develops the air flow that lifts the vehicle 12 off the ground. The fan may be positionally fixed relative to a vane assembly housing 40. This air flow which is directed to the vanes 14 is also used to control the direction of travel of the vehicle. In the present invention, in order to redirect the air flow, only the vanes 14 need to be moved, and the fan 30 can remain in a fixed position with respect to a vehicle frame 32, thereby simplifying the design and construction.

The outer vane 16 may be pivotally connected to the housing 40 along a series of bearings. The housing 40 surrounds and encloses the sides of the outer vane. The connection permits the outer vanes and the inner vanes secured thereto to be moved about a first axis of rotation A-A. The outer vane 16 may be operably connected to a first actuator 42 in order to permit the movement to be controlled. The first actuator 42 may be in the form of a server motor, DC motor, pneumatic drive or other component known in the art. The actuator 42 may be directly connected to the outer vane 16 or alternatively, it may be connected through a linkage such as a chain and sprocket linkage, belt linkage or other mechanical linkage of a type known in the art. Activation of the first actuator 42 causes the outer vane 16 and inner vanes 18 connected thereto to pivot about the first axis of rotation A-A.

The inner vanes 18 may be pivotally mounted to the outer vane about the second axis of rotation B-B. The second axis of rotation is preferably 180° offset from the first axis of rotation. A pivot shaft 44 may extend through each of the inner 18 and outer 16 vanes and it is upon this shaft that the inner vanes 18 may pivot. The inner vanes may be fixedly secured together such that they move together as the inner vane assembly 20. The inner vane assembly may be operably connected to a second actuator 46. The second actuator 46 is configured to pivot the inner vane assembly 20 about the second axis of rotation B-B. The second actuator 46 may include a motor, DC motor, stepper motor or other actuating device of a type known in the art. The first and second actuators 42 and 46 may be fixedly secured to the outer surface of the housing 40. Shafts may extend outside the housing and the shafts are mechanically coupled to the actuators. By locating the actuators on the outer surface of the housing, the flow of air through the vanes 14 is not obstructed.

Figure 8:
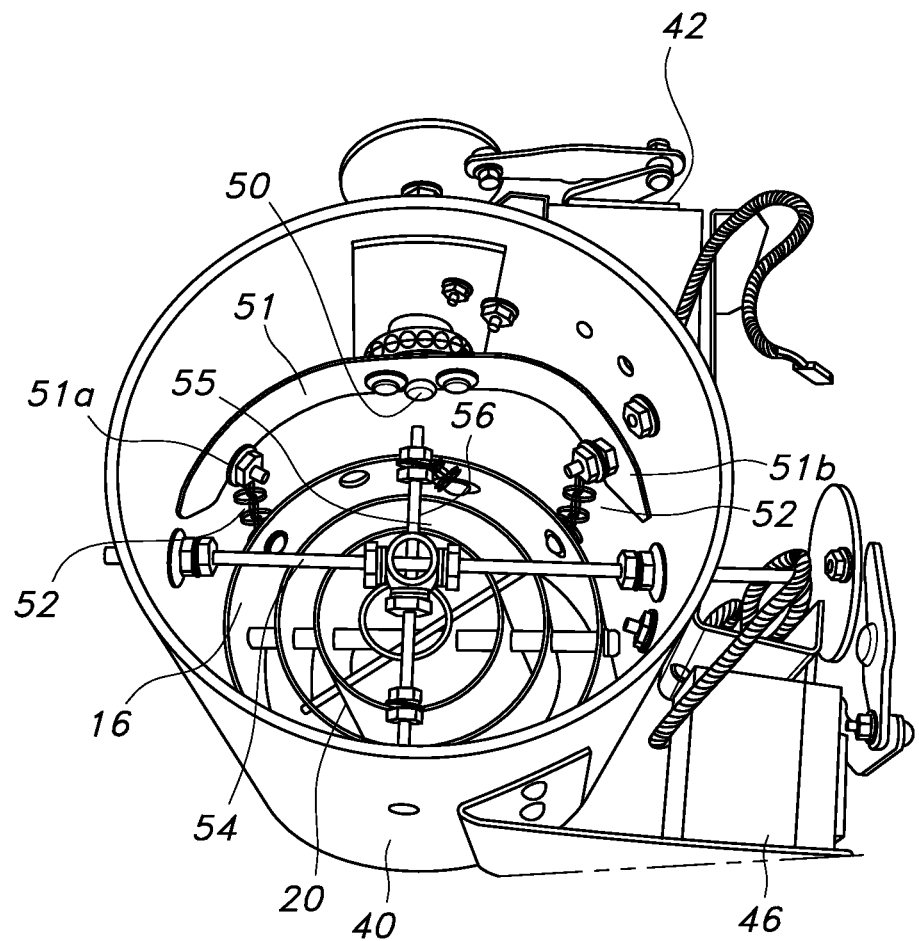
FIG. 8 is a perspective view of an upstream side of the control apparatus.

As shown in FIG. 8, the first actuator 42, may have a rod 50 that extends though the housing wall and attached to an arm 51. The arm 51 has curved ends 51a and 51b that follow the contour of the housing 40. The ends of the arms are connected to one end of a chain linkage 52. The other end of the linkage is attached to the outer vane 16. The first actuator 42 moves the arm 51 which in turn causes the vane assembly 11 to pivot about axis A-A. The second actuator 46 may be attached to a first rod 54 that extends across the housing 40. A second rod 55 extends perpendicularly from the first rod 54. The ends of the first rod are attached to one end of the chain linkages 56. The other end of the linkages are secured to the inner vane assembly 20. Accordingly, when the second actuator 46 rotated, the inner vane assembly 20 pivots about axis B-B. It is within the contemplation of the present invention that other types of connections and linkages may be used to connect the actuators to the vanes.

The actuators 42 and 46 may be each operably connected to a controller 45 (FIG. 1) which provides signals to the actuators in order to control the movement of the vanes. The controller 45 may in turn be operably connected to a user input device (not shown) which may be in the form of a joystick, steering wheel, or other control mechanism which provides a user of the device to control the actuators.

Figure 9:
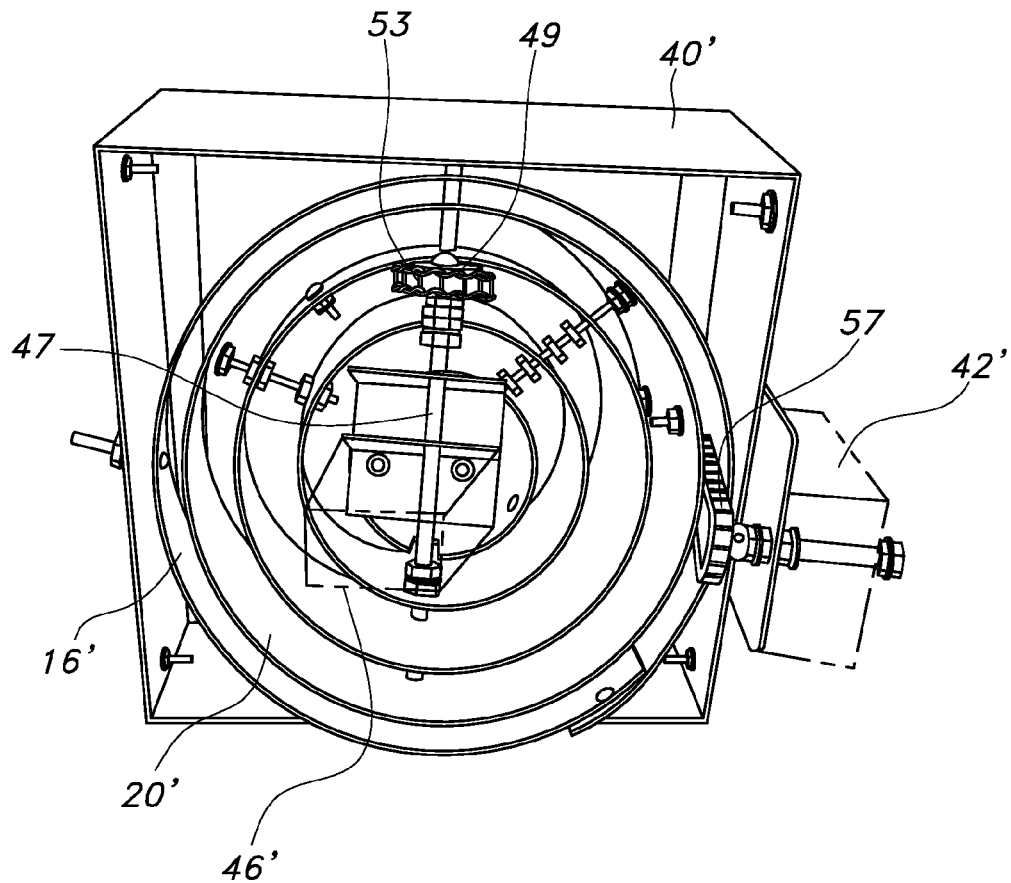
FIG. 9 is a perspective view of an alternative embodiment of the present invention showing an actuator in phantom.

In an alternative embodiment shown in FIG. 9, the second actuator 46' (shown in phantom) may be disposed within the housing 40'. The second actuator that moves the inner vane assembly 20' may be located generally in the middle of the inner vane assembly 20'. The second actuator 46' may be operably connected to a shaft 47 that is connected to a first sprocket 49. A chain 53 connects the first sprocket 49 to a second sprocket (not shown) which is attached to the inner vane assembly 20'. Therefore, activation of the second actuator 46' causes the inner vane assembly to rotate. Alternatively, the actuator may be secured to the outer vane 16'. The first actuator 42' (shown in phantom) is preferably secured to the housing 40' surrounding the vane assembly. The first actuator 42' may be connected via a shaft, sprocket and chain arrangement 57 to the outer vane 16', such that activation of the first actuator 42' causes the outer vane 16' and inner vane assembly 20' to both rotate in unison. The first and second actuators may be operably connected to a controller and user input as described above.

It is within the contemplation of the present invention, that the user control may be located on the frame to be operated by a user. Alternatively, the user control may be located remote of the vehicle such as in a RC (remote control) vehicle. In such an embodiment, the vehicle would have a receiver to receive communications from a remote transmitter held by the user. The remote transmitter would generate the signals which, in turn, would operate the actuators and provide the desired vehicle control.

With further reference to FIGS. 5-6, in the present invention, a space between the housing and the outer periphery of the outer vane 16 defines an air flow zone 60 from which air flow driven by the fan would extend outwardly therefrom in a generally downward direction and generally uncontrolled by the vanes. This downward flow provides the thrust needed to lift the vehicle. The portion of the air directed more centrally to the housing is directed through the vane assembly 11 and this air flow direction can be changed by moving the vanes in order to help propel the vehicle in a particular direction and control its travel. Accordingly, the air deflection apparatus 10 can be used to direct air to lift the vehicle as well as control its movement.

The outer vane 16 and the adjacent inner vane 18a define there between a first flow channel 62. The first flow channel 62 directs the flow of air primarily based upon the position of the outer vane 16. While movement of the inner vane assembly 20 will somewhat change this flow channel, its general direction will be defined by the outer vane.

The inner vanes form there between a second flow channel 64. The second flow channel 64 will be determined by both the position of the inner vane assembly and the outer vane. Accordingly, there are generally two flow channels which exit the vane assembly; the first flow channel being controlled in a first direction and the second flow channel being controlled independently of the first flow channel. When the inner vanes 18 are aligned with the outer vane 16 such that the central axis of the outer vane aligns with the central axis of the inner vane, the first flow channel 62 is aligned with the second flow channel 64. However, when the inner vane assembly 20 is adjusted such that its central axis is offset from the central axis of the outer vane, the first flow path will be in a direction different than the second flow path. These different flow paths may be used in order to effectively control the vehicle.

The various flow channels and flow zone of air combine downstream of the housing 40 to form a directed flow of air. Due to the adjustability of the position of the vanes 14 about multiple offset axes, the air flow can be directed in a multitude of directions to precisely control the direction of the air cushion vehicle 12.

FIGS. 1 and 7 show a fan 30 having a vane assembly 11 associated therewith. It is within the contemplation of the present invention that multiple fan/vane assembly 11 combinations could be provided on a vehicle frame 32. The controller 45 may be programmed in order to coordinate the movement of the vane assemblies and fans in order to provide the desired vehicle control.

Figure 10:
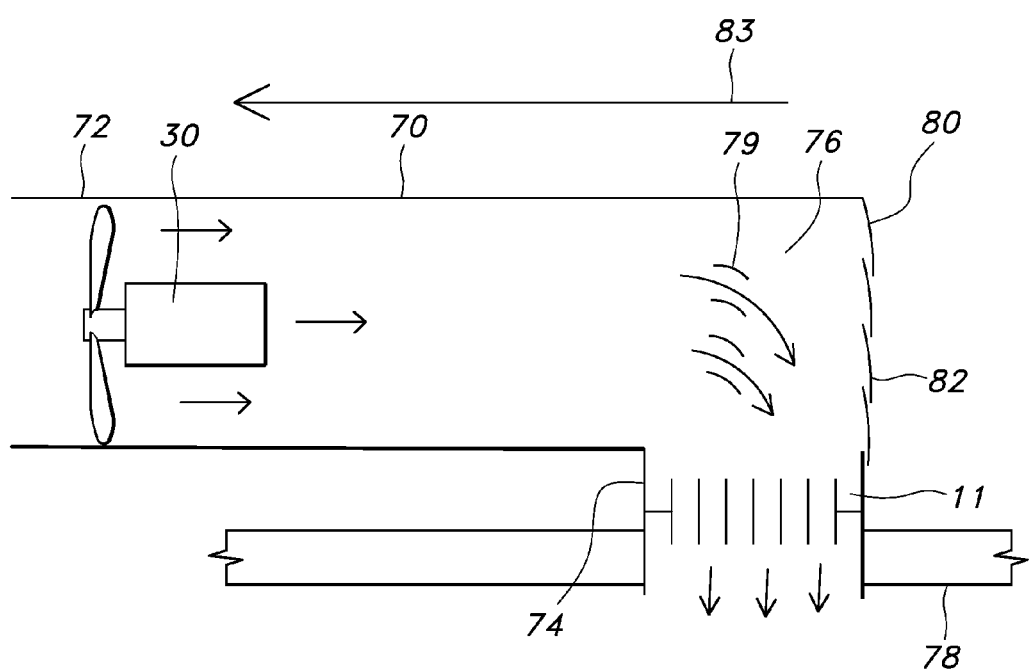
FIG. 10 is a side schematic view of an fan and vane assembly disposed in a duct.

In an alternative embodiment shown in FIG. 10, an air flow source in the form of a fan 30 may be located in a duct 70 upstream of the vane assembly 11. The duct 70 may have an L-shaped configuration with two legs 72 and 74 connected by a bend section 76. The fan 72 may be located in leg 72 and the vane assembly disposed in leg 74. Air flow generated by the fan is directed through the duct and turned by the bend section 76 toward the vane assembly. The flow of the air passing through the vane assembly 12 may be controlled in the manner described above and pass out of a hull or air foil 78. The bend section 76 may include turning vanes 79 that direct the flow of the air toward the vane assembly 11. A side wall 80 of the bend section may include flaps 82 that may be controlled to open and close to allow some of the air to exit the duct. The flaps 82 may include hinged members connected to an actuator operably connected to a controller (not shown). The controller and actuator cooperate to control the position of the flaps. This air flow can be used to augment forward propulsion of the air driven vehicle 12 as represented by arrow 83. The remainder of the airflow exiting the vane assembly 11 may be used to control the direction of the vehicle. It is further contemplated that one air flow source could provide air to a plurality of discrete vane assembly 11.

Figure 11:
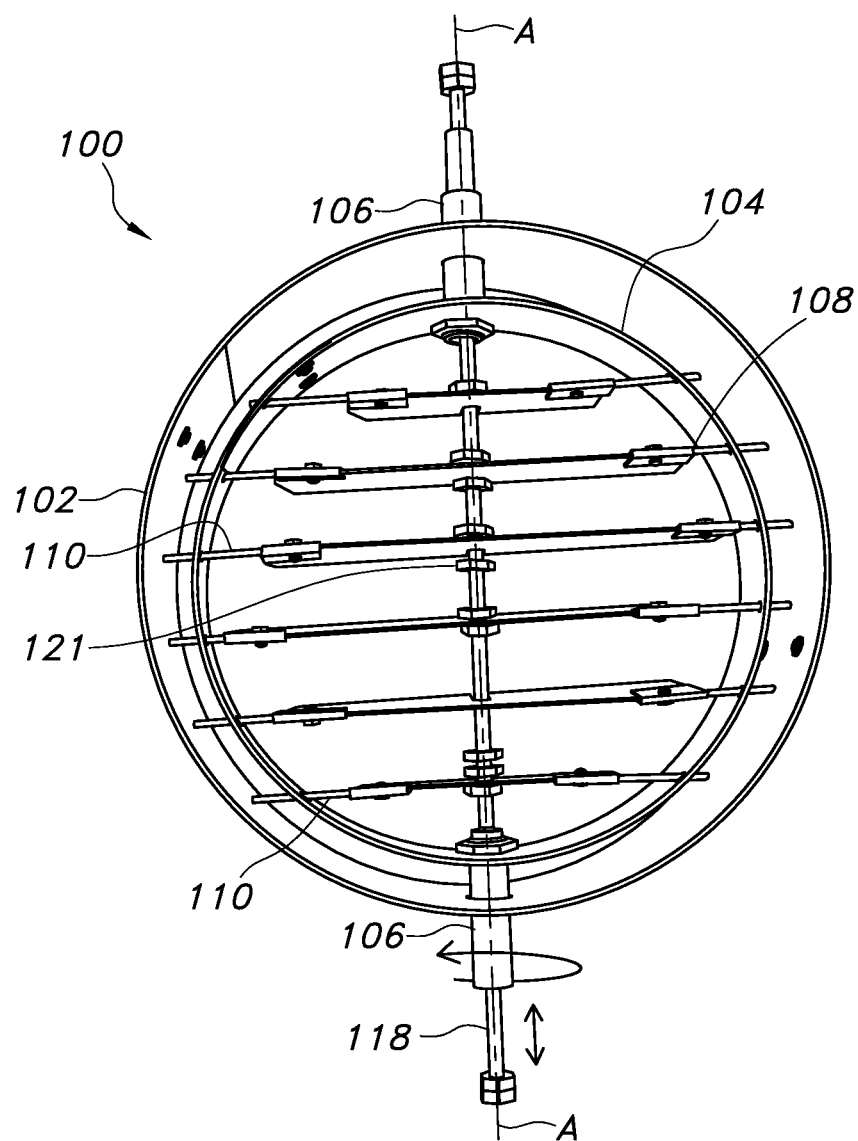
FIG. 11 is a top plan view of an alternative embodiment of an apparatus for air flow control showing vanes in a first position.
Figure 12:
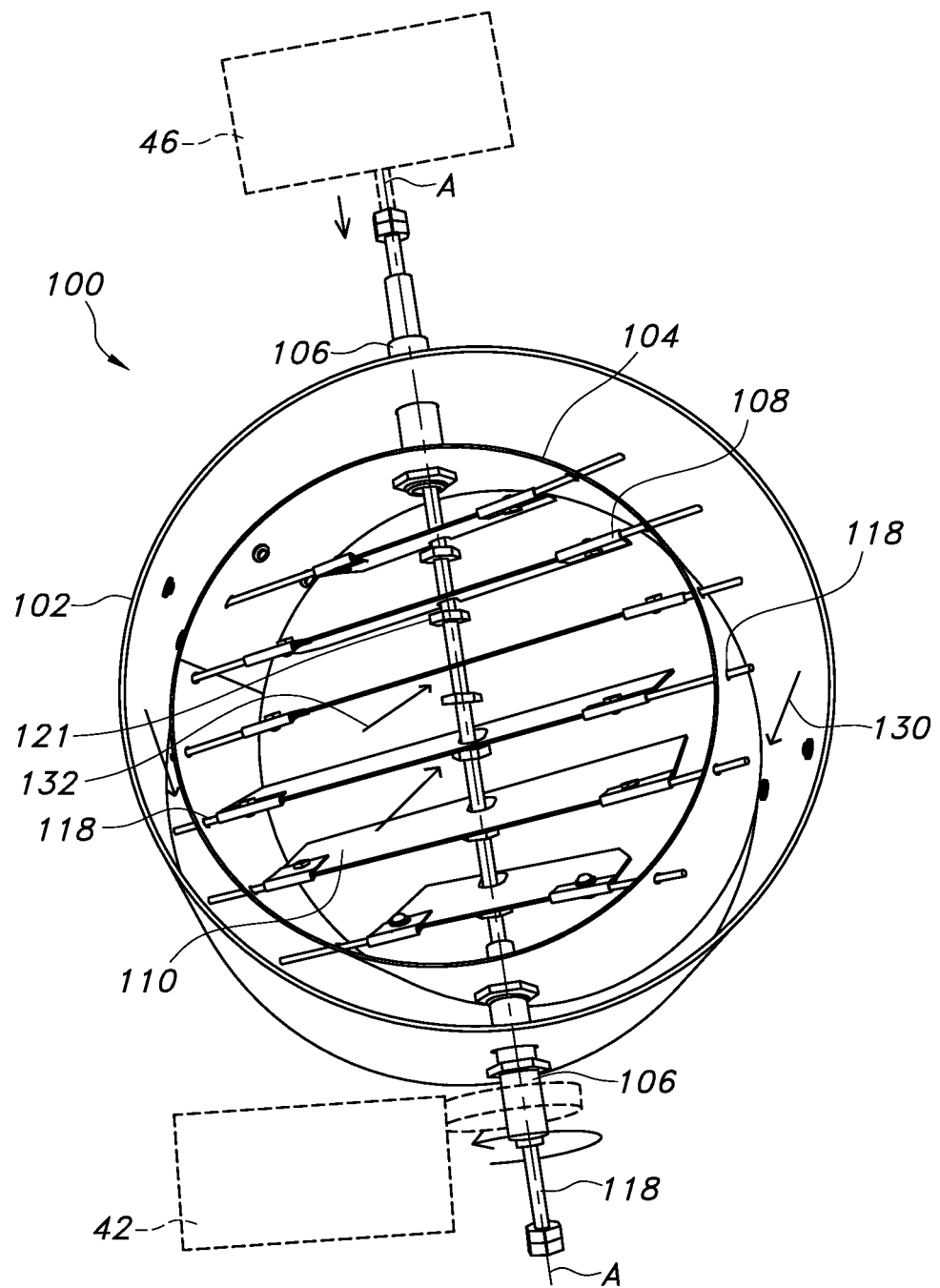
FIG. 12 is a top plan view showing vanes in a second position.
Figure 13:
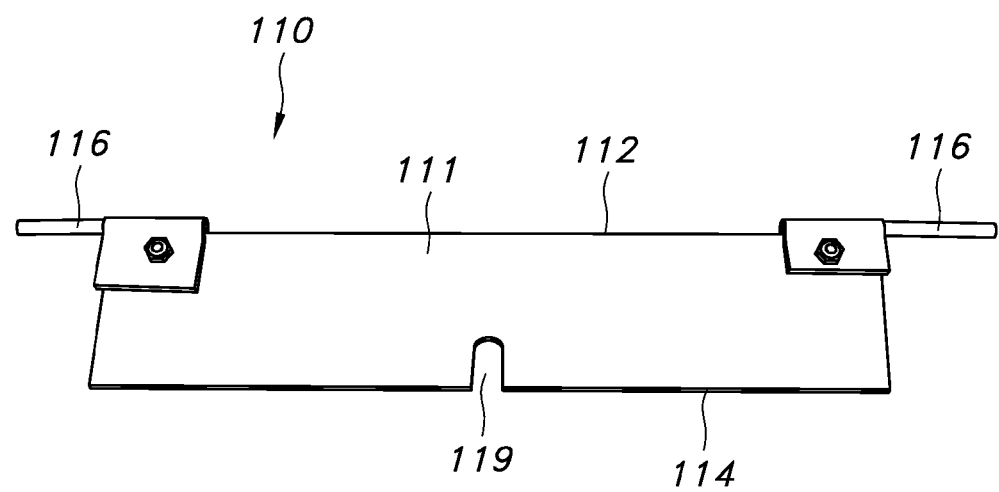
FIG. 13 is a perspective view of a vane.

With reference to FIGS. 11-13, a further alternative embodiment of the air deflector apparatus 100 for providing omnidirectional air flow control is shown. The apparatus 100 may be disposed downstream of an air flow source as in the previously described embodiments. The apparatus includes a housing 102 containing there-within and an outer vane 104 pivotally secured thereto. The outer vane 104 pivots relative to the housing 102 about an axis of rotation A-A. The outer vane may be fixedly connected at two ends to a pair of hollow shafts 106 that extend though the housing 102. The hollow shafts 106 are rotatably secured to the housing 102 and rotation of the hollow shafts 106 causes the outer vane to rotate about axis A-A. At least one of the shaft 106 may be operably connected to a first actuator 42 which rotates the outer vane 104 in a controlled manner. The first actuator may be in the form of a rotary actuator, such as a DC motor, stepper motor, rotary fluid power drive, or other rotary drive as is known in the art.

Disposed within the perimeter of the outer vane 104 is an inner vane assembly 108. Accordingly, activation of the first actuator 42 causes the outer vane 104 and inner vane assembly 108 to rotate about axis A-A. Inner vane assembly 108 may include a plurality of spaced inner vanes 110 pivotally connected to the outer vane 104. With reference to FIG. 13, each vane 110 may include a generally planar body 111 having a top edge 112 upstream of a bottom edge 114.

Extending outwardly from each side of the top edge is a swivel pin 116 fixedly secured to the vane body 111. The swivel pins 116 extend through holes 118 formed in a top portion of the outer vane 104. Each inner vane 110 has its own axis of rotation, and these axes of rotation are all generally perpendicular to the axis of rotation A-A of the outer vane. The bottom edge of each of the plurality of inner vanes 110 may each be connected to a control rod 118 extending though the hollow shafts 106 and beyond the housing. The bottom edge may include a notch 119 for receiving the control rod 118. For each vane 110, a keeper 121 is fixed on the control rod and disposed on either side of the vane. The keepers 121 connect the vane 110 to the control rod 118 while allowing the vanes 110 to pivot with respect to the rod. The control rod 118 is linearly translatable back and forth in the hollow shafts 106 to cause the vanes 110 to pivot in unison in relation to the outer vane 104. The control rod 118 may by operably coupled to a second actuator 46 that selectively moves the rod 118 to pivot the inner vanes to a desired position. The second actuator may be a linear actuator such as an electric linear drive, fluid power drive, or other linear drive as is known in the art.

In this embodiment, by rotating the outer vane 104, the inner vane assembly 108 also rotates about axis A-A. Movement to the control rod permits the inner vanes 110 to pivot about another separate axis of rotation different than axis A-A. The result is the ability to have a wide range of directional control and to precisely control the direction of the flow of air exiting the apparatus 100. In addition, the flow of air through the apparatus is generally unobstructed by control elements, other than the vanes, thereby eliminated unwanted flow conditions.

Figure 14:
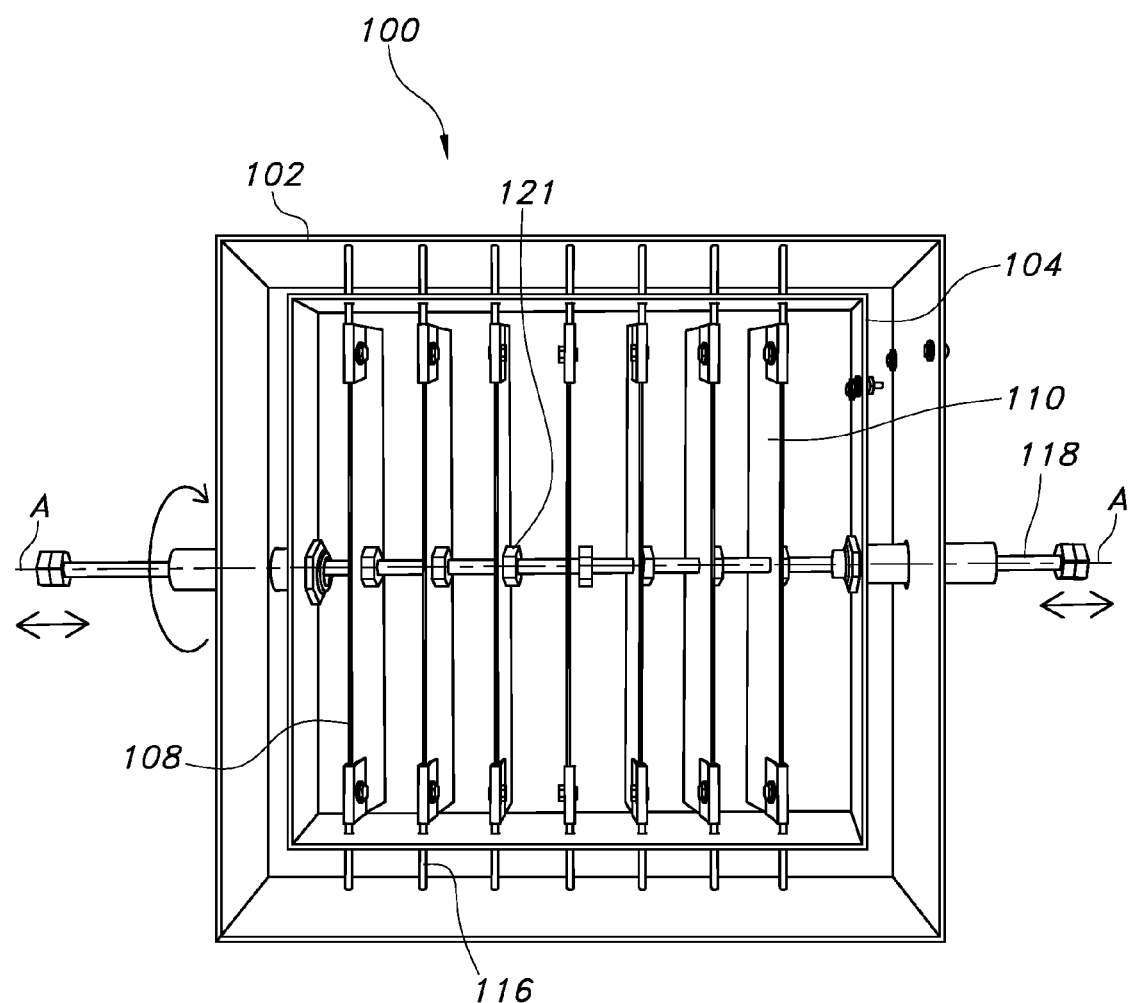
FIG. 14 is a further alternative embodiment of an apparatus for air flow control showing vanes in a first position.

In the embodiment shown in FIGS. 11-12, the housing 102 and vanes are generally round with the vanes being aligned concentrically. However, it is also contemplated, as shown in FIG. 14, that the housing 102, outer vane 104 and inner vanes 108, 110 could have a rectangular or square configuration. In this embodiment the elements would operate the same as in the round embodiment described above but would have a rectangular or square configuration. It is within the contemplation of the present disclosure that the shape of the vanes and housing could be varied to accommodate design and space specifications.

The space between the housing and the outer periphery of the outer vane 104 defines an air flow zone 130 from which air flow driven by the fan would extend outwardly therefrom in a generally downward direction and generally uncontrolled by the vanes. This downward flow provides the thrust needed to lift the vehicle. The portion of the air directed more centrally to the housing is directed through the vane assembly 108 and this air flow direction can be changed by moving the vanes in order to help propel the vehicle in a particular direction and control its speed and direction of travel.

The outer vane 104 and inner vanes cooperate to form a flow channel 132. The first flow channel 132 directs the flow of air based upon the position of the outer vane 104 and the inner vanes 110. The directed air flow channel 132 may be used to precisely and accurately control the direction of travel of the vehicle.

It is also within the contemplation of the present invention that the downward thrust to lift the vehicle could be provided by dedicated ducts for only that purpose and the deflector apparatus 100 may be used only for propulsion and movement control.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. An apparatus for controlling the propulsion and direction of an air cushion vehicle comprising:
    a housing;
    a first vane pivotally coupled to the housing and pivotable about a first axis, a gap formed between the first vane and housing to form a flow channel to permit the flow of air there between;
    a second vane assembly including at least one second vane disposed within the first vane, the second vane assembly is pivotally coupled to the first vane and pivotal about a second axis, the second axis being orthogonal to the first axis; and
    a first actuator operably coupled to the first vane and a second actuator operably coupled to the second vane assembly, wherein the first actuator pivots the first vane and the second vane assembly about the first axis and the second actuator pivots the second vane assembly relative to the first vane and about the second axis to control the flow of air through the housing.

2. The apparatus of claim 1, further including a fan positionally fixed relative to the housing for moving a stream of air through the housing and past the first vane and second vane assembly.

3. The apparatus of claim 1, wherein the first vane has an annular configuration.

4. The apparatus of claim 3, wherein the first vane is concentrically aligned with vanes of the second vane assembly.

5. The apparatus of claim 3, wherein the first actuator is located outside of the housing.

6. The apparatus of claim 1, wherein the second actuator is located inside of the housing.

7. The apparatus of claim 1, wherein the second vane assembly includes a plurality of vanes each rotating relative to the first vane about a common axis.

8. The apparatus of claim 1, wherein the second vane assembly includes a plurality of second vanes each rotating relative to the first vane about their own axis and wherein each of the second vane axes are perpendicular to the axis of rotation of the first vane.

9. An apparatus for controlling the propulsion and direction of an air cushion vehicle comprising:
    a housing;
        a first vane pivotally coupled to the housing and pivotable about a first axis;
        a second vane assembly including a plurality of second vanes disposed within the housing and within the first vane, the plurality of second vanes being pivotally coupled to the first vane and each of the plurality of second vanes being pivotal about a second axis generally orthogonal to the first axis, and the plurality of second vanes each pivot about a common axis of rotation; and
        a first actuator operably coupled to the first vane and a second actuator operably coupled to the plurality of second vanes, wherein the first actuator pivots the first vane and the second vane assembly about the first axis and the second actuator pivots the plurality of second vanes relative to the first vane about the second axis to control the flow of air through the housing.

10. The apparatus of claim 9, wherein the plurality of second vanes is concentric to each other.

11. The apparatus of claim 9, wherein the plurality of second vanes each pivots relative to the first vane about a separate axis.

12. The apparatus of claim 11, wherein the plurality of second vanes includes planar members spaced from each other.

13. The apparatus of claim 9, wherein the plurality of second vanes each includes hinge pins operably coupled to the first vane to permit the plurality of second vanes to pivot relative to the first vane.

14. The apparatus of claim 9, wherein the first vain is pivotally connected to the housing via a hollow shaft.

15. The apparatus of claim 14, wherein a control rod extends through the hollow shaft, and a connector rod is operably connected to the plurality of second vanes and the second actuator for moving the plurality of second vanes.

16. The apparatus of claim 9, wherein first actuator is a rotary actuator and the second actuator is a linear actuator.

17. The apparatus of claim 9, wherein the first vane is generally round.

18. The apparatus of claim 9, further including a fan positionally fixed relative to the housing for moving a stream of air through the housing.

19. A method of controlling the direction of an air cushioned vehicle comprising:
   providing an air source to generate an air flow;
   directing the air flow past a vane assembly, the vane assembly including a first vane and a plurality of second vanes disposed within the first vane and pivotally secured thereto, the first vane and plurality of second vanes being pivotable about a common first axis of rotation and the plurality of second vanes being pivotable relative to the first vane about a second axis of rotation, wherein the second axis of rotation is offset from the first axis of rotation;
   operating a first rotary actuator to pivot the vane assembly about the first axis; and
   operating a second linear actuator operably connected to the plurality of second vanes to pivot the second plurality of vanes relative to the first vane to control the flow of air exiting the vane assembly.

20. An apparatus for controlling the propulsion and direction of an air cushion vehicle comprising:
   a housing;
   a first vane pivotally coupled to the housing and pivotable about a first axis, the first vain being pivotally connected to the housing via a hollow shaft;
   a second vane assembly including a plurality of second vanes disposed within the housing and within the first vane, the plurality of second vanes being pivotally coupled to the first vane and each of the plurality of second vanes being pivotal about a second axis generally orthogonal to the first axis; and
   a first actuator operably coupled to the first vane and a second actuator operably coupled to the plurality of second vanes, wherein the first actuator pivots the first vane and the second vane assembly about the first axis and the second actuator pivots the plurality of second vanes relative to the first vane about the second axis to control the flow of air through the housing, and wherein a control rod extends through the hollow shaft, and a connector rod is operably connected to the plurality of second vanes and the second actuator for moving the plurality of second vanes.

21. An apparatus for controlling the propulsion and direction of an air cushion vehicle comprising:
   a housing;
   a first vane pivotally coupled to the housing and pivotable about a first axis;
   a second vane assembly including a plurality of second vanes disposed within the housing and within the first vane, the plurality of second vanes being pivotally coupled to the first vane and each of the plurality of second vanes being pivotal about a second axis generally orthogonal to the first axis; and
   a first actuator operably coupled to the first vane and a second actuator operably coupled to the plurality of second vanes, wherein the first actuator pivots the first vane and the second vane assembly about the first axis and the second actuator pivots the plurality of second vanes relative to the first vane about the second axis to control the flow of air through the housing, and wherein the first actuator is a rotary actuator and the second actuator is a linear actuator.

22. An apparatus for controlling the propulsion and direction of an air cushion vehicle comprising:
   a housing including a perimeter wall having a length extending along a direction of airflow though the housing, the housing having a housing axis extending in the direction of the length;
   a first vane pivotally coupled to the housing and pivotable about a first vane axis;
   a second vane assembly including at least one second vane disposed within the first vane, the second vane assembly is pivotally coupled to the first vane and pivotal about a second vane axis, the second vane axis being orthogonal to the first vane axis; and
   a first actuator operably coupled to the first vane and a second actuator operably coupled to the second vane assembly, wherein the first actuator pivots the first vane and the second vane assembly about the first vane axis such that the first vane axis is pivoted relative to the housing axis, and the second actuator pivots the second vane assembly relative to the first vane and about the second vane axis to control the flow of air through the housing.

* * * * *